(12) United States Patent
Falkenberg et al.

(10) Patent No.: US 11,481,358 B2
(45) Date of Patent: *Oct. 25, 2022

(54) ADAPTING A WORKFLOW

(71) Applicant: INTERNATIONAL BUSINESS MACHINES CORPORATION, Armonk, NY (US)

(72) Inventors: Matthias Falkenberg, Stuttgart (DE); Stefan Alfons Hepper, Morgan Hill, CA (US); Stephan Laertz, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/513,500

(22) Filed: Jul. 16, 2019

(65) Prior Publication Data

US 2019/0370226 A1 Dec. 5, 2019

Related U.S. Application Data

(63) Continuation of application No. 12/967,351, filed on Dec. 14, 2010, now Pat. No. 10,430,387.

(30) Foreign Application Priority Data

Dec. 22, 2009 (EP) .................................. 09180276

(51) Int. Cl.
 *G06F 16/176* (2019.01)
 *G06F 16/9536* (2019.01)
 (Continued)

(52) U.S. Cl.
 CPC ........ *G06F 16/176* (2019.01); *G06F 16/9536* (2019.01); *G06Q 10/06* (2013.01); *G06Q 10/10* (2013.01)

(58) Field of Classification Search
 CPC .............. G06F 16/176; G06F 16/9536; G06Q 10/10; G06Q 10/06; G06Q 10/0633;
 (Continued)

(56) References Cited

U.S. PATENT DOCUMENTS 6,151,583 A * 11/2000 Ohmura ........... G06Q 10/06316
 705/7.26
7,035,910 B1 * 4/2006 Dutta ..................... G06Q 10/10
 707/999.008

(Continued)

FOREIGN PATENT DOCUMENTS

JP 2002109166 A 4/2002
JP 2004013321 A 1/2004
(Continued)

OTHER PUBLICATIONS

Bohlmann, Stefan; "Web Content Management in the Enterprise Portal—Quo Vadis?" URL : http://www.btexx.com/downloads/Quo%20vadis%20-%20Web%20Content%20Management%20in%20Enterprise%20Portal.pdf; btexx business technologies GmbH, Mainz, Germany, Jan. 20, 2006.

(Continued)

*Primary Examiner* — Mariela Reyes
*Assistant Examiner* — Fatima P Mina
(74) *Attorney, Agent, or Firm* — Steven L. Nichols; Fabian VanCott

(57) ABSTRACT

A method for adapting a workflow of a content management system comprises setting an allowed action for a user, creating at least one information item depending on the allowed action for the user, in which the at least one information item comprises content to be published and a first information item status level indicative of a present status level of the content within the workflow, and executing the workflow which comprises stages each correspond- (Continued)

ing to a respective information item status level, such that a next stage of the workflow is determined based on a combination of different types of user status information, indicative of a status of the user, and the first information item status level.

19 Claims, 9 Drawing Sheets

(51) Int. Cl.
*G06Q 10/10* (2012.01)
*G06Q 10/06* (2012.01)

(58) Field of Classification Search
CPC ........... G06Q 10/103; G06Q 10/06312; G06Q 10/06316; G06Q 10/063114; G06Q 10/063
See application file for complete search history.

(56) References Cited

U.S. PATENT DOCUMENTS

| | | | |
|---|---|---|---|
| 7,120,632 B2 | 10/2006 | Helmbrecht | |
| 7,299,202 B2 | 11/2007 | Swanson | |
| 7,325,193 B2 | 1/2008 | Edd | |
| 7,451,477 B2 | 11/2008 | Griffin | |
| 7,472,342 B2 | 12/2008 | Haut | |
| 2002/0103683 A1* | 8/2002 | Tsuda | G06Q 10/06316 705/7.26 |
| 2002/0184255 A1* | 12/2002 | Edd | G06F 16/958 715/205 |
| 2003/0051213 A1 | 3/2003 | Mitsui | |
| 2004/0133660 A1 | 7/2004 | Junghuber | |
| 2004/0205134 A1* | 10/2004 | Digate | H04L 67/24 709/206 |
| 2005/0222902 A1* | 10/2005 | Coit | G06Q 30/02 705/14.6 |
| 2006/0015942 A1* | 1/2006 | Judge | H04L 51/12 726/24 |
| 2006/0059151 A1 | 3/2006 | Martinez | |
| 2006/0277079 A1* | 12/2006 | Gilligan | G06Q 10/025 705/6 |
| 2007/0179790 A1* | 8/2007 | Leitch | G06Q 10/06316 705/301 |
| 2008/0222147 A1 | 9/2008 | El Homsi | |
| 2009/0025087 A1 | 1/2009 | Peirson, Jr. | |
| 2009/0106234 A1 | 4/2009 | Siedlecki | |
| 2009/0119258 A1 | 5/2009 | Petty | |
| 2009/0319402 A1 | 12/2009 | Manista | |
| 2010/0115612 A1* | 5/2010 | O'Brien | G06F 16/27 726/22 |
| 2010/0125471 A1* | 5/2010 | Wang | G06Q 10/0635 705/7.28 |

FOREIGN PATENT DOCUMENTS

| | | |
|---|---|---|
| JP | 2006146506 A | 6/2006 |
| JP | 2008015986 A | 1/2008 |

OTHER PUBLICATIONS

Jahia; URL: "Enterprise Web Content Management"; http://www.jahia.com/jahia/Jahia/site/jahiacom/web_content_management; 2002-2009 Jahia Solutions Group.

Reddot Solutions; "Reddot Liveserver Integration With Sap® Enterprise Portal—Whitepaper"; http://www.silkroad.com/SiteGen/Uploads/Public/SRT/Whitepaper/Keys_to_Portal_Success.pdf.

Silkroad Technology, Inc.; "Content Management:The Key To Enterprise Portal Success"; http://www.contentmanagement365.com/Content/Exhibition6/Files/8a54043a-fe8f-4211-a3dd-1362e9d1706d/RedDot%20SAP%20Portal%20WPaper%20250407.pdf; 2004.

* cited by examiner

ADAPTING A WORKFLOW

RELATED APPLICATION

The present application is a continuation of U.S. application Ser. No. 12/967,351, filed Dec. 14, 2010, which corresponds to and claims the priority of European Patent Application No. 09180276.9 filed on Dec. 22, 2009, the disclosure of which is incorporated herein by the reference in its entirety.

BACKGROUND

The present specification relates generally to a method for adapting a workflow and more specifically, a method for dynamically adapting a workflow of a content management system, as well as to a related content management system for dynamically adapting a workflow system.

BRIEF SUMMARY

A method for adapting a workflow of a content management system comprises setting an allowed action for a user, creating at least one information item depending on the allowed action for the user, in which the at least one information item comprises content to be published and a first information item status level indicative of a present status level of the content within the workflow, and executing the workflow which comprises stages each corresponding to a respective information item status level, such that a next stage of the workflow is determined based on a combination of different types of user status information, indicative of a status of the user, and the first information item status level.

A content management system for adapting a workflow comprising a setting unit adapted for setting an allowed action for a user, a user interface configured to enable the user to create at least one information item depending on the allowed action for the user, in which the at least one information item comprises content to be published and a first information item status level indicative of a present status level of the content within the workflow, a storage unit adapted for storing the at least one information item, a workflow engine comprising a dynamic workflow stage determination engine adapted for executing the workflow which comprises stages each corresponding to a respective status level, such that a next stage of the workflow is determined based on a combination of different types of user status information, indicative of a status of the user, and the first information item status level.

A computer program product for adapting a workflow, comprising a computer readable storage medium having computer readable program code embodied therewith, the computer readable program code comprising computer readable program code configured to set an allowed action for a user, computer readable program code configured to create at least one information item depending on the allowed action for the user, in which the at least one information item comprises content to be published and a first information item status level indicative of a present status level of the content within the workflow, and computer readable program code configured to execute the workflow which comprises stages each corresponding to a respective information item status level in which a next stage of the workflow is determined based on a combination of different types of user status information, indicative of a status of the user, and the first information item status level.

A method of publishing content on a computer network, the method comprising assigning to each of a number of users associated with a content management system at least one user role, creating at least one information item depending on the user role assigned to the user creating the at least one information item, in which the at least one information item comprises content to be published and a first information item status level indicative of a present status level of the content within the workflow, storing the at least one information item to a web content database, with a dynamic workflow stage determination engine, executing a workflow which comprises stages, each stage corresponding to a respective status level, such that a next stage of the workflow is determined based on a combination of different types of user roles, indicative of a status of the user, and the first information item status level, and publishing, to the computer network, the at least one information item.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
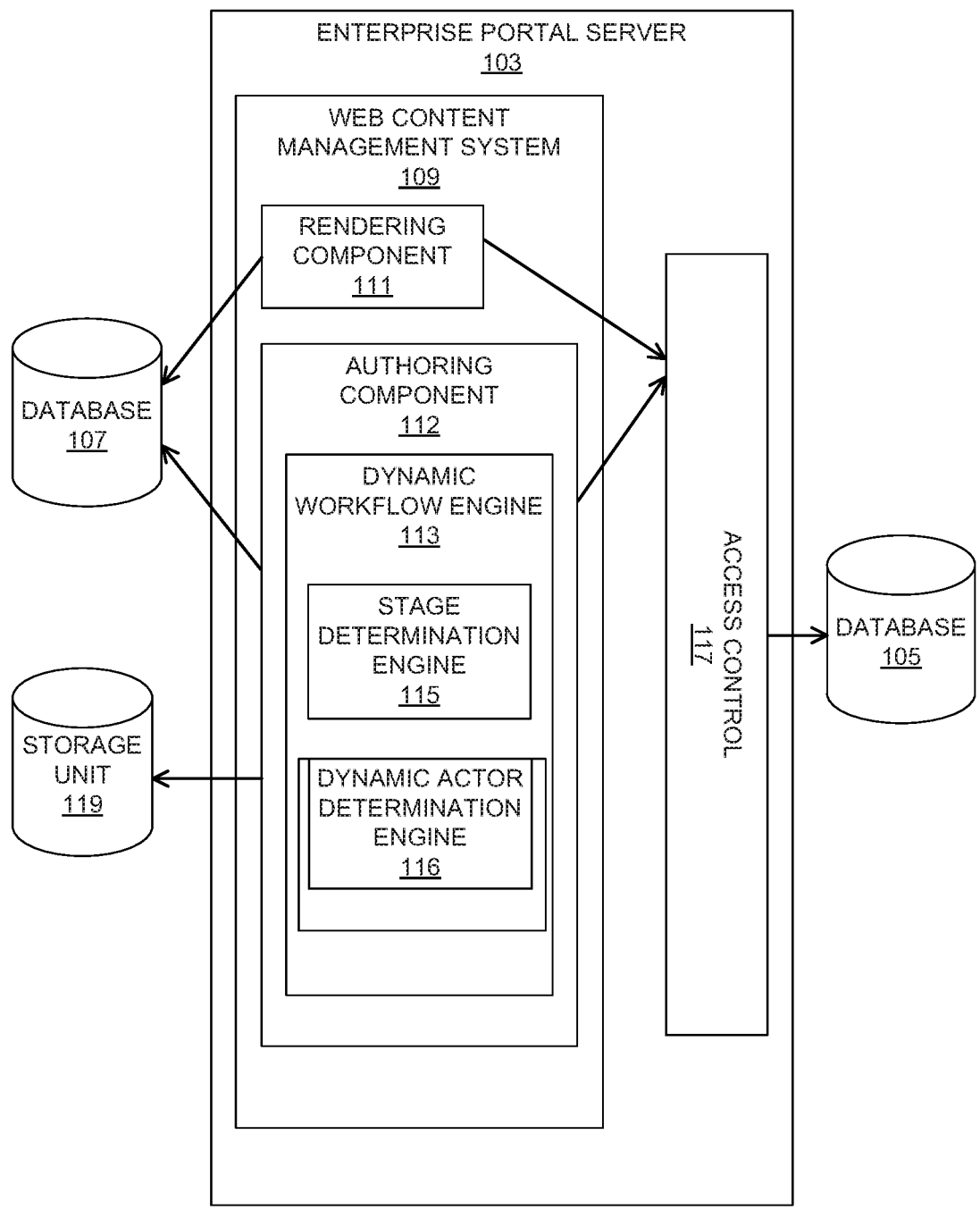
FIG. 1 is a block diagram of a content management system for dynamically adopting a workflow, according to one exemplary embodiment of principles described herein.

The Internet has become a familiar way for a user to search for and obtain information. The information on the Internet is basically organized as Web pages. These Web pages are provided by a large community of content providers. Content providers may be comprised of freelance authors, newspaper companies, and enterprises presenting themselves in the Internet, an Intranet, or an Extranet. An enterprise presentation typically comprise enterprise background information such as historical data, financial data, and organizational data, as well as information about products and services offered for sale. Enterprises having a broad range of services and products may generate a large number of Web pages in order to present the full spectrum of offerings of an enterprise. The operator or owner of the enterprise may wish to have the content of these Web pages updated and renewed on a regular basis. The same may apply to news agencies. To accomplish this, a larger number of employees or external contributors may be involved in the creation of the content for an enterprise's Web pages. In order to have a structured approach for content creation, content review, and content approval, enterprises and other organizations presenting a large amount of content on the Internet or intranets follow pre-defined workflows of these processes. Such workflows are typically supported by software products called an authoring system which may comprise a workflow engine. These are often embedded in content management systems or Web content management systems for storing and/or modifying the created content for the Web pages as well as for managing different stages of the workflow that may be associated to an information item forming an extended portion or flag of the content to be published on an intranet or the Internet. Fundamentally, there are no differences between a publication inside an enterprise via an intranet or externally to the enterprise via the Internet.

Typical stages for information items may be as follows: "draft 1," "draft 2," "approved," "published," "expired," and "deleted." For example, a first contributor may generate or create a first draft, which is then passed on to another employee, editing the first draft and generating a second draft. The second draft may be forwarded to a supervisor who may be authorized to approve the second draft. In some instances, the information item may need to be approved again, for example, by a chief editor, a legal department, or legal approver before the information item is finally published on the intranet or the Internet. Many information items may also contain a flag which may set a date at which the information item expired, meaning that the information item is no longer valid and may no longer be presented to users of the intranet or Internet. If the information item is finally invalidated, the information item may be set into the stage or status "deleted."

Forwarding on or passing-on an information item to a next workflow stage through a pre-defined workflow in a conventional workflow engine of a conventional content management system may depend on whether a flag has been associated with the information item. Because of the growing number of contributors, reviewers, supervisors, and approvers of Web content or information items, the pre-defined workflow, as part of a conventional content management system or Web content management system, may be too restrictive.

The present specification discloses a method for dynamically adapting a workflow of a content management system and a content management system for dynamically adapting a workflow. According to one aspect of the present application, a method for dynamically adapting a workflow of a content management system and a content management system for dynamically adapting a workflow may comprise setting an allowed action for a user, creating at least one information item depending on the allowed action for the user, wherein the at least one information item comprises content to be published and a first information item status level indicative of a present status level of the content within the workflow, storing the at least one information item, and dynamically executing the workflow which comprises stages. Each of these stages corresponds to a respective first information item status level. The execution of the workflow happens in such a way that the next stage of the workflow is determined depending on a combination of different types of user status information, indicative of a status of a user and the first information status level.

According to a further aspect of the present application, a content management system for dynamically adapting a workflow is provided. The content management system comprises a setting unit adapted to set an allowed user action for a user, and a user interface adapted to enable a user to create at least one information item depending on the allowed action for the user, wherein the at least one information item comprises content to be published and a first information item status level indicative of a present status level of the content within the workflow. The content management system further comprises a storage unit adapted to store the at least one information item and a workflow engine comprising a dynamic workflow stage determination engine adapted to dynamically execute the workflow which comprises stages, each corresponding to a respective status level. The next stage of the workflow is determined depending on a combination of different types of user status information, indicative of a status of the user and the first information status level.

In the context of this application the following expression convention have been followed:

User—A user may denote a person with a certain relationship to information items which may be published on the Internet, an Intranet or an Extranet. The person may be an individual internal or external content contributor or simply a contributor, an editor, an approver, a chief editor, or a systems administrator for a Web content management system. A user may have a user profile stored in a computer, describing certain characteristics also known as attributes with attribute values relative to the user. This may, for example, be a user name, a user identification number, a department which the user belongs to, certain access rights to certain applications, certain access rights to certain data, a right to create information items, a right to improve information items, and so on. A user accesses a content management system typically via a Web browser. However, it can be appreciated that other user interfaces may be used.

User Role—A set of user attributes may be pre-defined as user roles. Attributes or a user role may be, for example, a department the user belongs to, his language skills, his application and/or data access rights, and so on. The concept of user roles makes the management of individual users in a computer system easier for system administration because a role setting of characteristics, respectively attribute values, may be managed group-wise and not on an individual user level.

Information item—In this context, an information item may denote, for example, a text passage or paragraph, a picture, a video, a sound element, or a combination of any of the above, or any other information format suitable for the presentation on the Internet or in an in-house content management system. A creation of an information item may include copying an existing information item and using the information item in the sense of the workflow.

Content—Content may denote a single information item, but typically a larger amount of information items to be managed by a content management system or more specifically, in the case of Web content, by a Web content management system. If the content will only be published inside a company, i.e., only to its employees, the same principles of the content management system may be applied to an intranet. However, other content creation, modification, approval, and distribution systems are also possible.

Content management system—A content management system may denote a collection of procedures used to manage a workflow in a collaborative environment. These procedures may typically be computer-supported. The procedures may be designed to allow for a large number of people or users to contribute to and share stored data or information items; control an access to the data based on a user role; be instrumental in easy storage and retrieval of data; reduce duplicate input of information items; improve the ease of report writing about the content being managed; and improve the communication between users. The data is typically stored in a database. Part of a content management system is a workflow engine.

Workflow engine—A workflow engine may denote a software application that manages and executes computer supported processes. In the case of a workflow engine adapted for managing content, the workflow engine may be adapted to assist in the creation, modification, approval, expiry, and deletion of information items. A workflow engine interprets events, such as "documents submitted to a server" or "a document's due date expires," and acts on them according to pre-defined workflow processes. The actions may be anything from saving a document in a document management system to issuing new work by sending an e-mail as a notice to one or more users, or escalating overdue information items to a supervisor. A workflow engine facilitates the flow of information, tasks and events in a workflow system.

Stage in a workflow—Typically, in a workflow certain stages of the workflow may be defined through which a document or information item needs to be passed from creation to publishing, to expiry, or to eventual deletion, hence, describing the life-cycle of a document or information item. At each stage, a certain action needs to be executed on the document or information item. This may be for example the creation of the information item, a review of the information item, or an approval of the information item.

The workflow may be executed in a dynamic way depending on a creator, editor or approver of the information item. Therefore, the sequence of stages within the workflow does not have to be executed in a fixed, pre-defined sequence. In contrast to such a fixed, pre-defined sequence, a next stage in the workflow may be determined by the dynamic workflow engine comprising a dynamic workflow stage determination engine as well as a dynamic actor determination engine. This determination may not only depend on the previous stage, but also on a combination of different types of user status information. Approvers may also edit the relevant information item.

One of such type of user status information may be, for example, a historic transaction status. Such a historic transaction status may, for example, be positive if a normal editor of information items has passed his generated information items to a chief editor, and the chief editor approved the historic or previous information items created by the editor for the last, for example, ten times. This positive determination indicates that the editor is a "trusted editor" and that an approval of the information item generated by the editor by the chief editor may be not required. Instead, the information item created by the editor may be published immediately, without an approval of a chief editor or other approvers.

In other exemplary embodiments of the present application, another type of user status information may be a special user profile status. Such a special user profile status may be special technical knowledge in a special technical field. The user profile status may be set by the user himself or by other users of the exemplary workflow system. If an editor of an information item edits information in his special technical field, an approval by a chief editor may not be required. In this case, the workflow is shortened, bypassing the chief editor, and publishing the information item directly by the Web content management system. This may reduce manual workload of users in the content creation and approval process through an automatic routing within a workflow or within a process flow based on certain conditions because no longer fixed, pre-defined workflow stages are followed in a fixed sequence. The conditions may be determined based on a combination of different user status information and/or different types of second information status levels of the relevant information items.

In another embodiment, the information item status level comprises one out of the group consisting of a draft status level, an approved for publishing status level, an expired status level, and a deleted status level. In particular, the draft status level may be split into several different status levels, for example, a first draft status level, a second draft status level, and/or a third draft status level. This way, different contributors or employees in an enterprise may contribute to a draft of an information item to be published. It is also possible that the same person creating and editing the information item may manage different draft versions in the content management system without immediately passing on a draft version to a further reviewer or approver in the workflow.

In a further embodiment, the different types of user status information comprises at least one out of the group consisting of a user role status, a user profile status, and a historic transaction status. However, all different types of user status information may be reflected at the same determination.

A user role status may, particularly, be the role of an external information item contributor or an employee of an enterprise, e.g., a product manager, being allowed to create information items. Another user role may be a chief editor. Again, another user role may be a legal approver. Such a legal approver may be required to include legally binding information as part of an information item if the information item is expected to be published on the Internet. Generally, a user role may be used for a group management of several users.

A user profile status may, in particular, be a special characteristic or attribute of a user. In such a user profile status, special skills of a user may be flagged. Special skills may be, for example, being a recognized expert in a special technical or other knowledge field, special language skills, or a time zone a user is typically working in.

A historic transaction status may, in particular, be a flag showing that an information item that has been created by a user has been published without any modifications to the information item. Such modifications to the originally created information item may typically be performed by chief editors or legal approvers. If an information item created by a user has been published without any modifications, for example, for the last ten information items that a user has created, a positive historic transaction status flag may be set. If such a positive historic transaction status is set, the workflow may be adapted dynamically so that the next stage of the workflow is not an approval stage by a chief editor but instead the information item is approved directly by a user having a positive historic transaction status in a single step. This way, the approval step of a chief editor may be omitted so that the information item may be ready for publication immediately. This may reduce manual intervention in the workflow of creating, editing, and approving information items to be published on Web pages, thereby enhancing the speed at which content or, in particular, Web content may be created, approved, and published.

In a further embodiment, the stored information items may additionally comprise another information item status level which may be linked to the information status level. Such a second information item status level may be used by the dynamic workflow engine to execute workflow stages in a dynamic way. This means that not a pre-defined sequence for all information items needs to be executed during the course of the workflow.

In yet another embodiment, the second information item status level may comprise at least one out of the group of an urgency level, language information, content area, and content type. An urgency level may denote individual levels of urgency, e.g., very urgent, urgent, normal, or not critical in time. The language of the information item may refer to the language in which the information item is created in. In particular, it may denote classical human languages, like English, French, or German. A content area may denote that an information item belongs to a special content area, e.g., to a first, second, or a third product group. Alternatively, the content area may denote that the information item may belong to the area of enterprise background information, actual business results, service offerings, distribution channel information, or other enterprise specific information areas. A content type information may be information about the appearance of the information item, as text, as an image, as a sound bite, and/or as a video. It may also be a flag indicating that the information is provided as a presentation, an unchangeable PDF-format, a special format for a handicapped person, e.g., larger letters, or any other special format of the information item. It should be understood that, in particular, any such special flags or information item status level may be combined so that there is one information item status level about the language, another one for a special content area, a third one for a special presentation format and so on.

In a further embodiment of the content management system, the dynamic workflow engine may additionally comprise a dynamic actor determination engine adopted to perform the method for dynamically adapting a workflow of a content management system wherein a second information item status level is considered when dynamically determining the next workflow stage. If, for example, the second information item status level indicates that an information item may have been created using the German language, the dynamic actor determination engine assigns a next approval step in the dynamic workflow to an approver with German language skills. Other potential users that may generally be able to approve such an information item but may not have German language skills may not be considered by the dynamic actor determination engine. Such a mechanism is especially useful if there may be more than one approver for an information item having different language skills.

In another scenario, the second information item status level may indicate that the publication of this information is very urgent. If for the next approval level, several employees of an enterprise or several users are eligible, the dynamic actor determination engine of the dynamic workflow engine may direct the information item in the next stage to be performed in the workflow to another user. The dynamic actor determination engine may direct the information item to a user who is actively working during the hour of the day at which the dynamic actor determination engine has to determine to which of the potential users the next approval step or next stage of the workflow has to be directed. Again, this may make the workflow much more dynamic. Thereby the system may not be required to follow a fixed, pre-defined sequence of workflow stages assigning work items in the form of editing approval steps to certain fixed, pre-defined users. In particular, there may be a second information item status level indicating the language of the information item, a third information item status level for an urgency status, and another information item status level for a special content area. Additional other types of information item status levels may be possible to designate other characteristics or attributes of the information item. All types of information item status levels may be present at the same time for one individual information item.

It should be noted that embodiments of the present specification have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of present specification are apparent from the examples of embodiment to be described hereinafter and are explained with reference to the examples of embodiment. The exemplary embodiments will now be described in more detail with reference to the figures, but to which the subject matter of the present specification is not limited.

In the following a detailed description of the drawings will be given. All illustrations in the drawings are schematic. Firstly, a conventional computing environment including a conventional workflow system will be described. Afterwards, the exemplary method for dynamically adapting a workflow of a content management system and the functioning of the exemplary content management system will be described.

Figure 8:
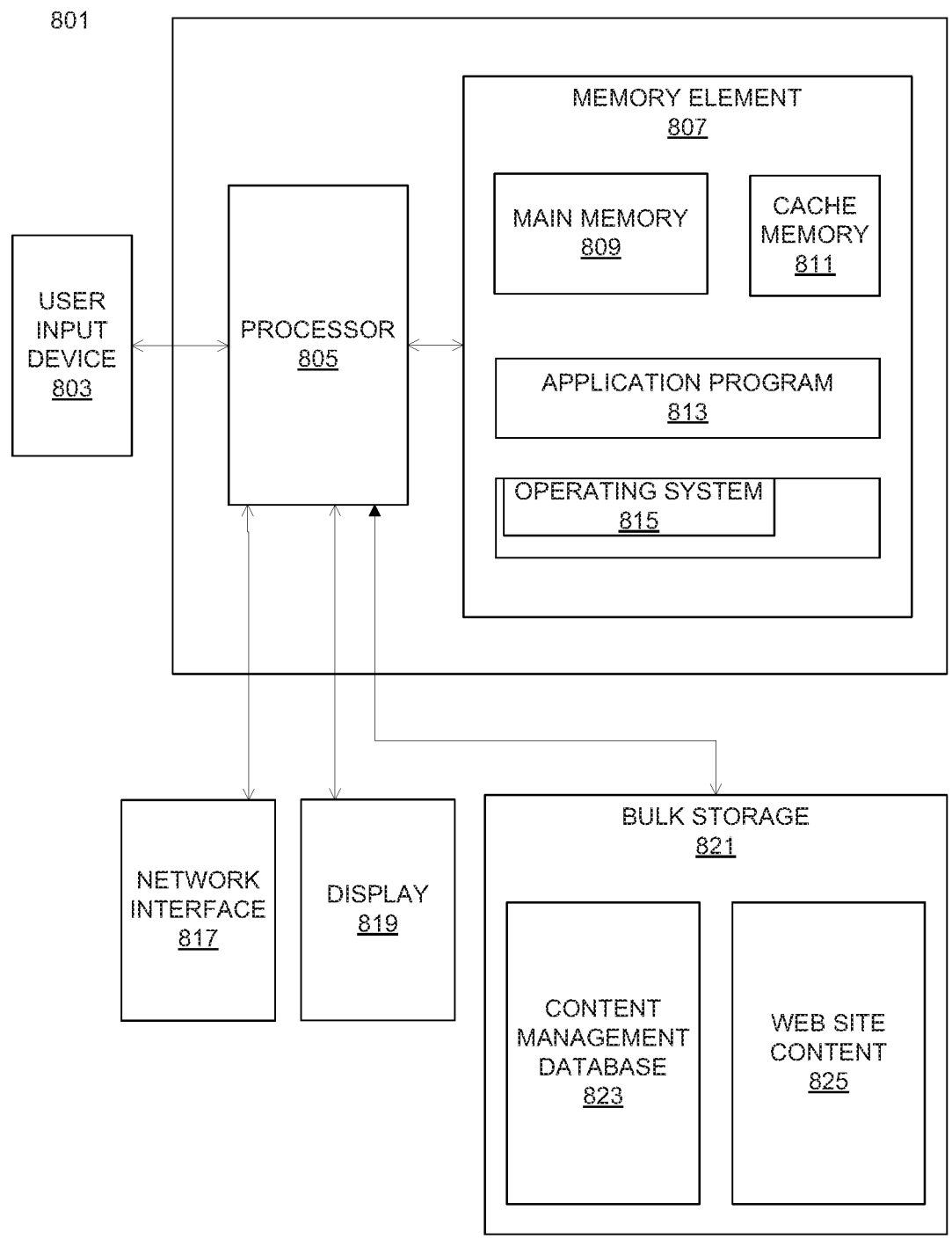
FIG. 8 is block diagram illustrating a conventional computer on which one or more stages of the dynamic workflow executed by the workflow management system for dynamically adopting a workflow may be executed, according to one exemplary embodiment of principles described herein.

FIG. 8 shows a conventional data processing system (801) suitable for storing and/or executing program code. The data processing system (801) includes at least one processor or a multi processor or multi-core-processor (805), coupled directly or indirectly to memory elements (807) through a system bus. The memory elements (807) may include a main memory (809), employed during actual execution of the program code, and a cache memory (811), which provides temporary storage of at least some program code in order to reduce the number of times code must be retrieved from bulk storage (821) for an execution. Additionally, a user input device (803), a display (819) and a network interface (817) may be provided. The mass or bulk storage (821) may contain Web site content (825), a content management database (823), and other data or program code required for running a conventional data processing system. In particular, the Web content (825) may be contained within the content management database. Blocks (815) and (813) may denote an operating system (815) or parts thereof and an application program (813) or parts thereof, both loaded into the main memory (809). The application program may be a web browser and/or the program code for a content management system and/or a groupware application. The network interface (817) may enable the data processing systems or computer to become coupled to other data processing systems, remote printers, or storage devices through intervening private or public networks. Modems, cable modems, and Ethernet cards are just a few of the currently available types of network adapters.

Figure 9:
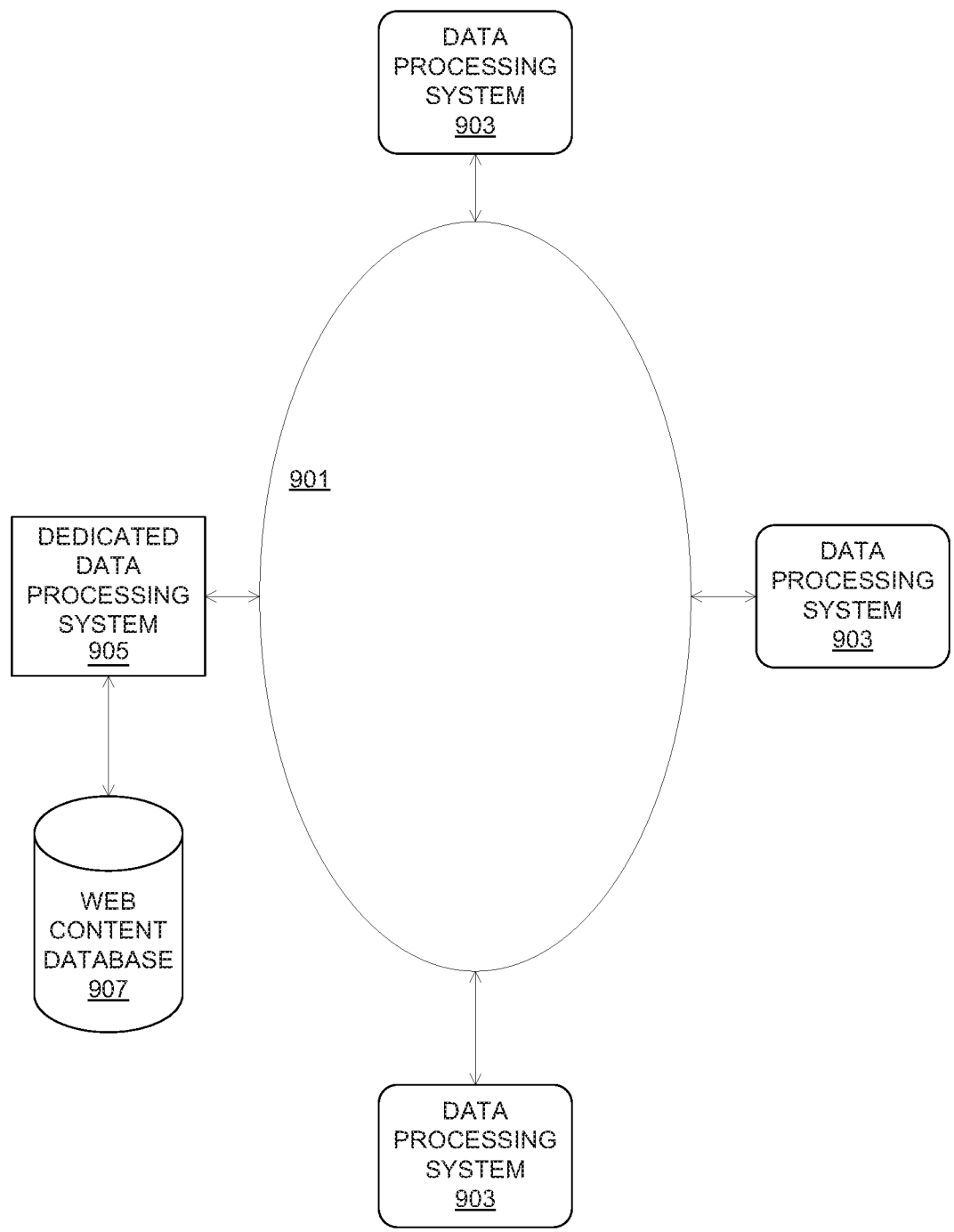
FIG. 9 is a block diagram illustrating a computer network with connected computer systems and a dedicated computer system running the content management system, according to one exemplary embodiment of principles described herein.

FIG. 9 illustrates a plurality of data processing systems (903) being connected to a network (901). In particular, a dedicated data processing system (905) may comprise a content management system or a Web content management system with an associated Web content database (907). A user may access the functions of the content management system through a Web browser installed together with an operating system driving the functions of the data processing system (903). Other user interfaces to the content management system are possible.

Figure 2:
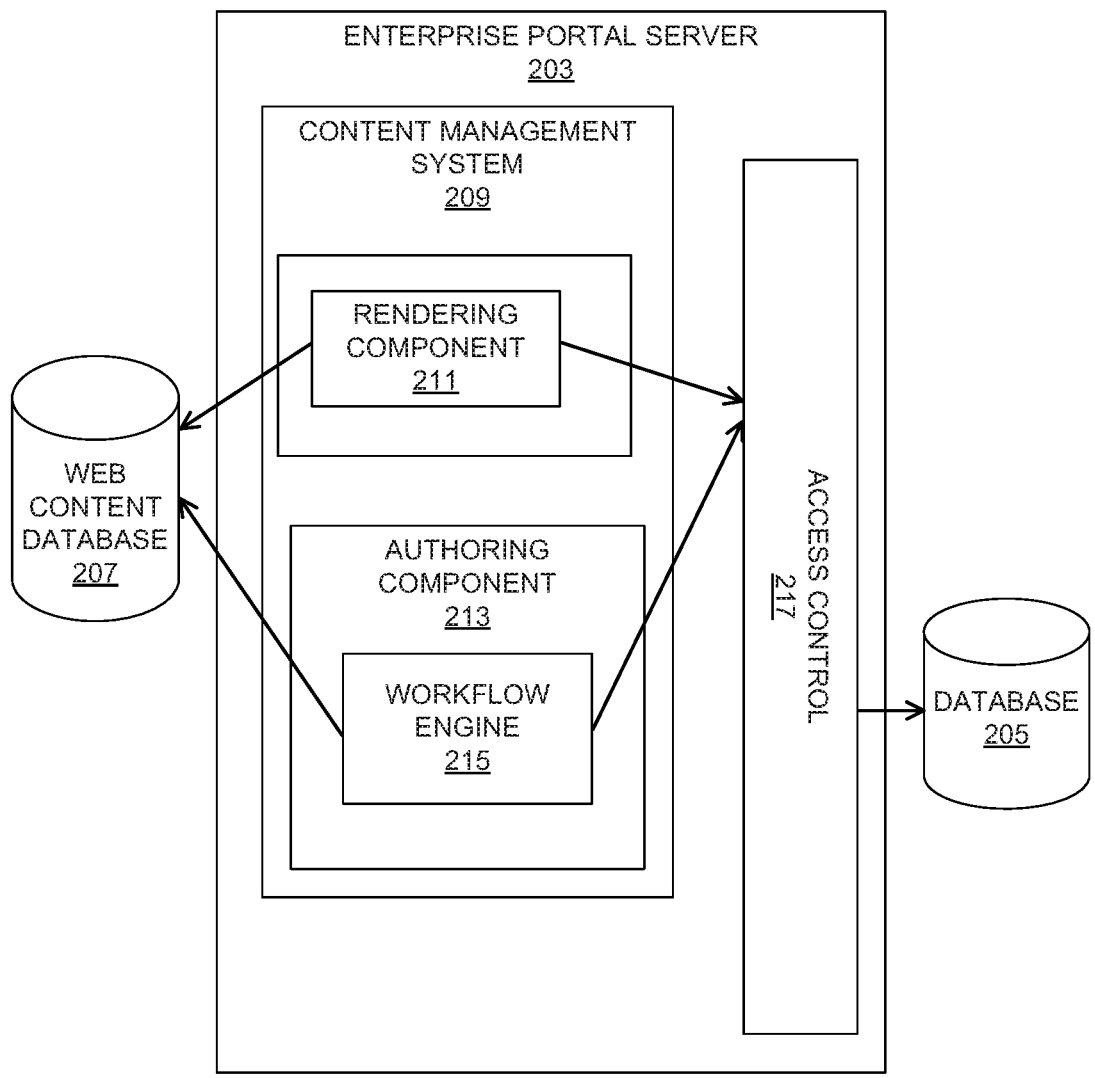
FIG. 2 is a block diagram showing components of a conventional Web content management system.

FIG. 2 illustrates a conventional content management system for a conventional workflow. The content management system (209) may be part of an enterprise portal server (203). An access control module (217) may control which user may have access to what type of content of the content database or Web content database (207). In order to perform such access control, the access control (217) may access a database (205) containing user permission data or rights. A rendering component (211) renders information items, stored in the database (207) containing content in order to be displayed in different types of user interfaces. An authoring component (213) comprises a workflow engine (215). Such workflow engine (215) may control the flow of documents or information items through the workflow of the content management system in a fixed or pre-defined way, such that after a creation of an information item, the information item is passed from one workflow stage to a next in a pre-defined manner. Such stages may include one or more approval stages, involving different approvers, before the information item is finally published.

Figure 3:
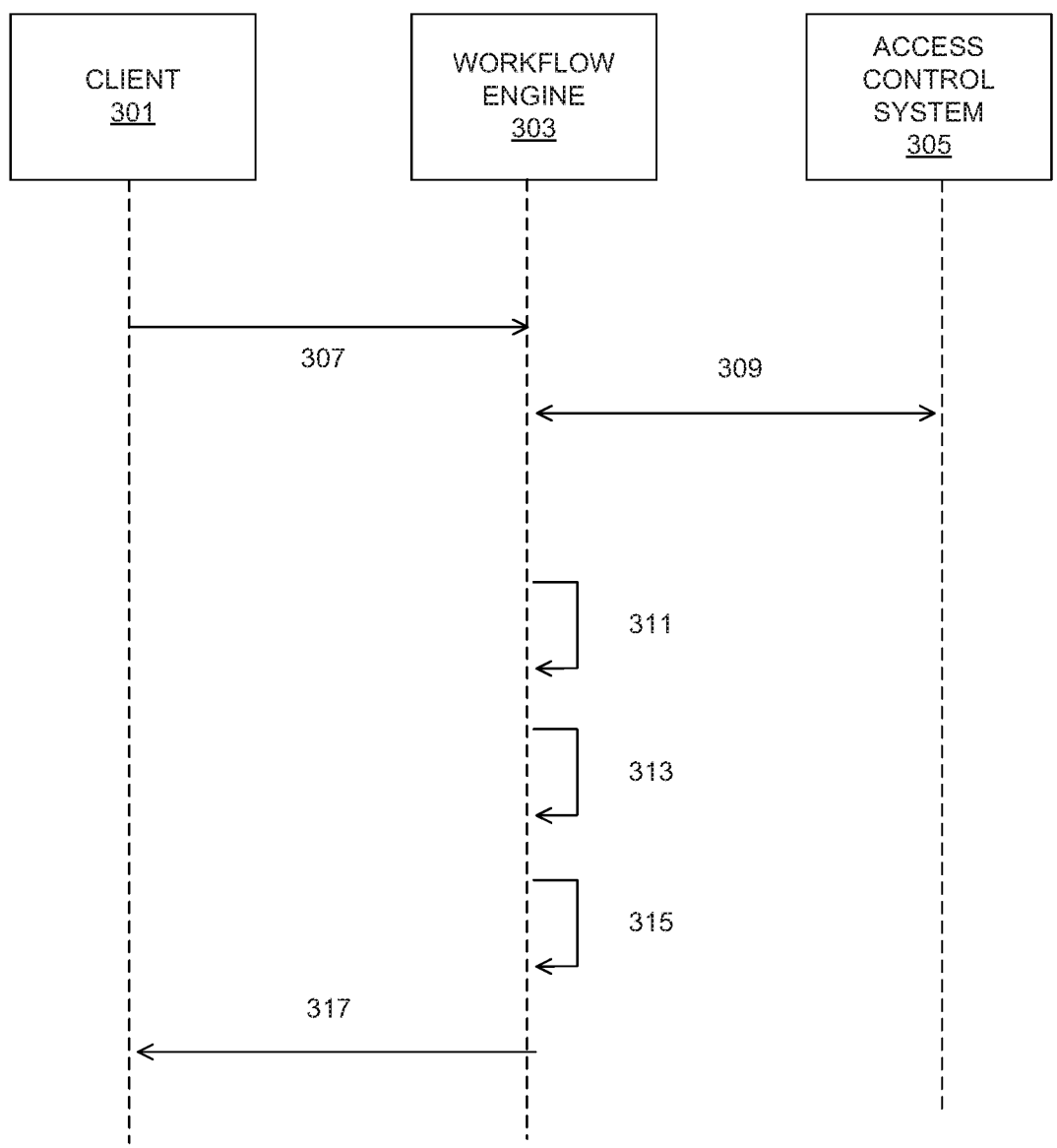
FIG. 3 is a block diagram showing a conventional workflow performed in a conventional content management system.

FIG. 3 illustrates a transaction status diagram illustrating a series of steps in the conventional workflow engine. A client (301) or client data processing system, may be operated by a user, may send a request (307) for a change of a workflow stage for an information item C to the workflow engine (303). It may be required to verify (309) that the current user has a required user role with an appropriate access right for performing the requested action on information item C. This may be performed by accessing an access control system (305). If the user has the required permission for the requested change of a workflow stage for information item C, the workflow engine (303) determines (311) the current stage of information item C. In step (313), the workflow engine determines the next workflow stage for information item C. This next workflow stage is fixed, pre-defined and a subsequent or next step by a conventional workflow engine. Such a fixed path through a workflow is typically designed when the different stages of the workflow are defined using a conventional workflow engine. In step (315), the workflow engine (303) executes workflow actions applicable to a workflow stage change for information item C. This may be, for example, setting an information item status level corresponding to the next workflow stage, and/or informing the next user about the change of a workflow stage for information item C and that he has to perform the next action, e.g., approve the information item C. An approver may be informed by an e-mail that may be sent automatically from the workflow engine (303) to the respective next user—here an approver—in the workflow. Finally, the workflow engine delivers a feedback (317) to the user or client (301) on a workflow stage change for information item C.

FIG. 1, in contrast to FIG. 2, illustrates components of an exemplary content management system in a block diagram. In addition to the components already discussed in relation to FIG. 2, the authoring component (112) may now comprise a dynamic workflow engine (113) comprising a stage determination engine (115) instead of a static workflow determination engine of a conventional content management system. Furthermore, the workflow engine (113) according to the exemplary concept may comprise additionally a dynamic actor determination engine (116).

Moreover, there may be a storage unit (119) provided to store user profile and/or user status data. The remaining components like a database (105) for user permission data, access control (117), a rendering component (111), a web content management system (109), and a database (107) for Web content of the enterprise portal server (103) are equivalent to the components already discussed in the context of FIG. 2.

Figure 4:
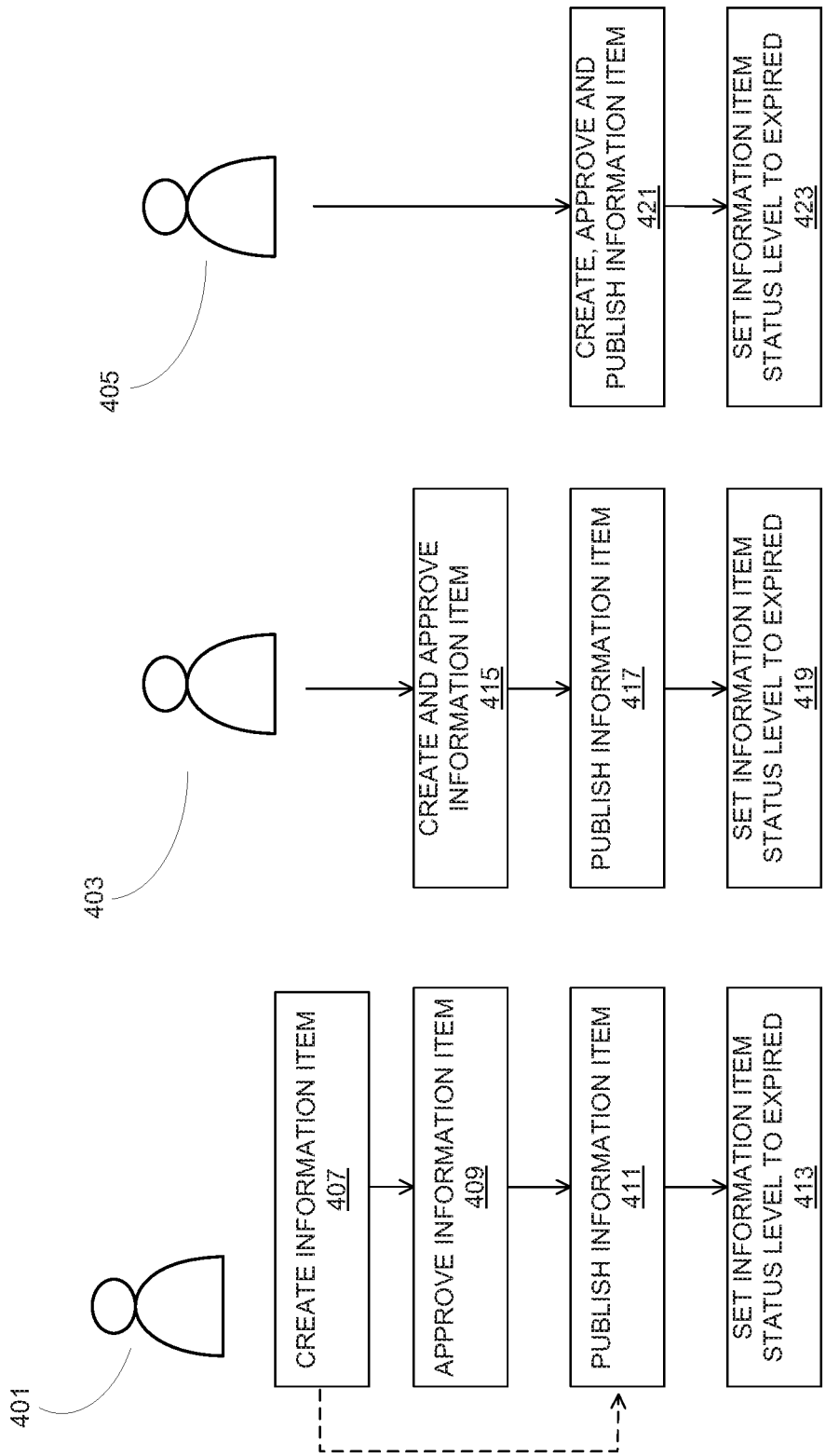
FIG. 4 is a block diagram showing potential workflow steps in a content management system with respect to different user types.

FIG. 4 illustrates different workflows for information items to be published. Different user types (401, 403, 405) with different roles or different types of user status information dynamically influence the workflow. FIG. 4 shows three types of users: a contributor (401), an editor (403), and a chief editor (405). If a contributor (401) creates a new information item, an information item status level may be set to a draft status level. This indicates a first stage in a workflow for a creation of publishing-ready information items. An arrow between workflow stages or blocks in FIG. 4 may denote a transition from one workflow stage to a next workflow stage.

Next, the information item may be passed to an editor (403). He may approve (Block 409) the information item so that the dynamic workflow engine may pass the information item to a next workflow stage. An information item status may be set to "approved by the editor." In a next stage, the information item may be passed to a chief editor (405). He may decide to publish (Block 411) the information item. In this case, the information item status level may be set to "published." After a certain period of time, the chief editor may decide that the information item is no longer valid. In this case, the information item status level may be set to "expired" (Block 413) in the content management system. It should be noted that only certain, dedicated users based on dedicated user roles may be allowed to perform specific tasks in the sequence of the workflow stages denoted by the Blocks 407 to 423 in FIG. 4.

If, in a conventional content management system, an editor (403) would create a new information item himself, the information item may flow through the workflow and may be controlled by the workflow engine in the same way as if a simple contributor (401) would have created the information item. The editor (403) would create the information item (Block 407). Next, he may need to approve his own information item in a next stage of the workflow (Block 409). Finally, the information item may be passed to a chief editor (405) for a final decision to publish the information item (Block 411). The editor 405 would have to approve his own information item as if somebody else would have created it.

In contrast, and with the exemplary content management system for dynamically adopting a workflow based on a dynamic workflow determination engine and a dynamic actor determination engine, it may be possible to depart from a fixed, pre-defined workflow of a conventional workflow system. Based on his role as editor (403), the workflow engine may not force the editor to store his information item as a draft version and then perform the next step of the workflow by an approval step (Block 409), but directly create (Block 415) the information item and approve (Block 415) the information in one single step (415). The steps or stages of Block 417 and Block 419 may correspond to the publication step (Block 411) and the expiration step (Block 413) as described above. An equivalent dynamically shortened workflow would relate to the case in which a chief editor may create an information item himself.

If a chief editor (405) creates a new information item, he may bypass the first two steps or stages (Blocks 407 and 409) in the workflow and directly generate, approve and decide for the publication of an information item (Block 421). This means that the workflow may be dynamically adapted to reflect different permissions, roles, or skills and so on of different users when creating for, approving, and deciding on publication of an information item. Block 423 may denote a stage to set an information item into the status "expired." Additionally, if a chief editor edits or approves the information item directly after the contributor has created the information item, then the approval stage of the editor would be by-passed, again shortening the workflow dynamically; as can be seen by the dotted line in FIG. 4. Thus, the workflow comprises modifier based dynamics and approver based dynamics, meaning that the workflow is executed dynamically depending on the creator/modifier/editor of an information item, as well as on an approver. However, any approver may have the privilege to modify an information item.

Figure 5:
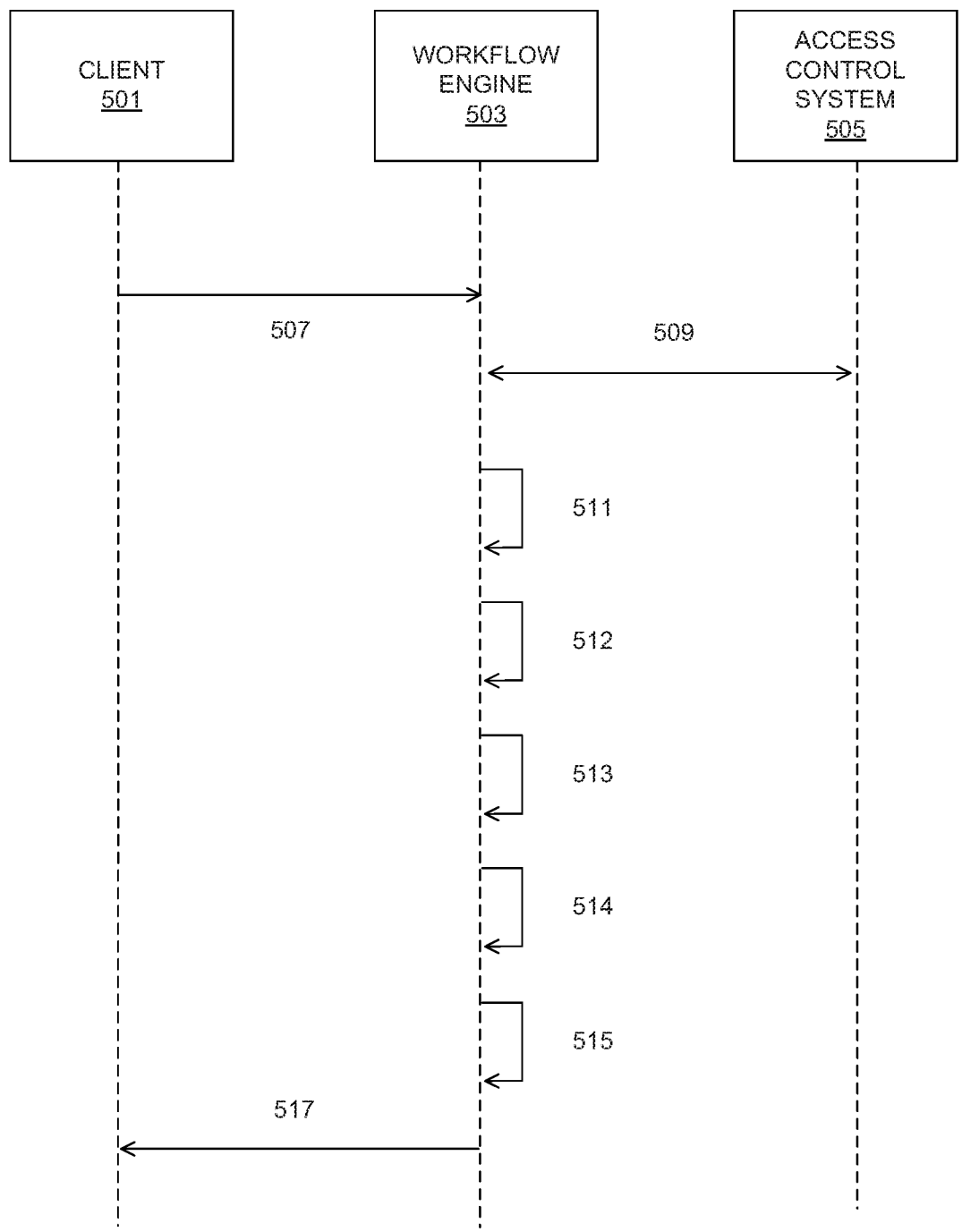
FIG. 5 is a block diagram illustrating the workflow within a workflow management system, according to one exemplary embodiment of principles described herein.

FIG. 5 illustrates a transaction status diagram or flow diagram of a dynamic workflow stage determination engine according to the exemplary concept. A user or client (501) may request (507) a change of a workflow stage for an information item C. Such a request is passed to the dynamic workflow stage determination engine (503). Firstly, verification (509) may be performed to determine whether the current user has the required permission or access rights for the requested change of the stage of a workflow. In order to perform this, the dynamic workflow stage determination engine (503) may request the appropriate data from an access control system (505). The dynamic workflow stage determination engine (503) may then determine (511) the current workflow stage for information item C. Next, the dynamic workflow stage determination engine (503) evaluates profile data of a last modifier of information item C (512). Afterwards, the dynamic workflow stage determination engine (503) may evaluate user profile data of a current user of information item C (513). Then, the dynamic workflow stage determination engine (503) calculates or determines (514) a next workflow stage for information item C. Finally, the dynamic workflow stage determination engine (503) executes (515) workflow actions applicable to the necessary workflow stage change for information item C. At the end of such a cycle, the dynamic workflow stage determination engine (503) delivers (517) feedback to the user or client (501) about a workflow stage change for information item C.

Figure 6:
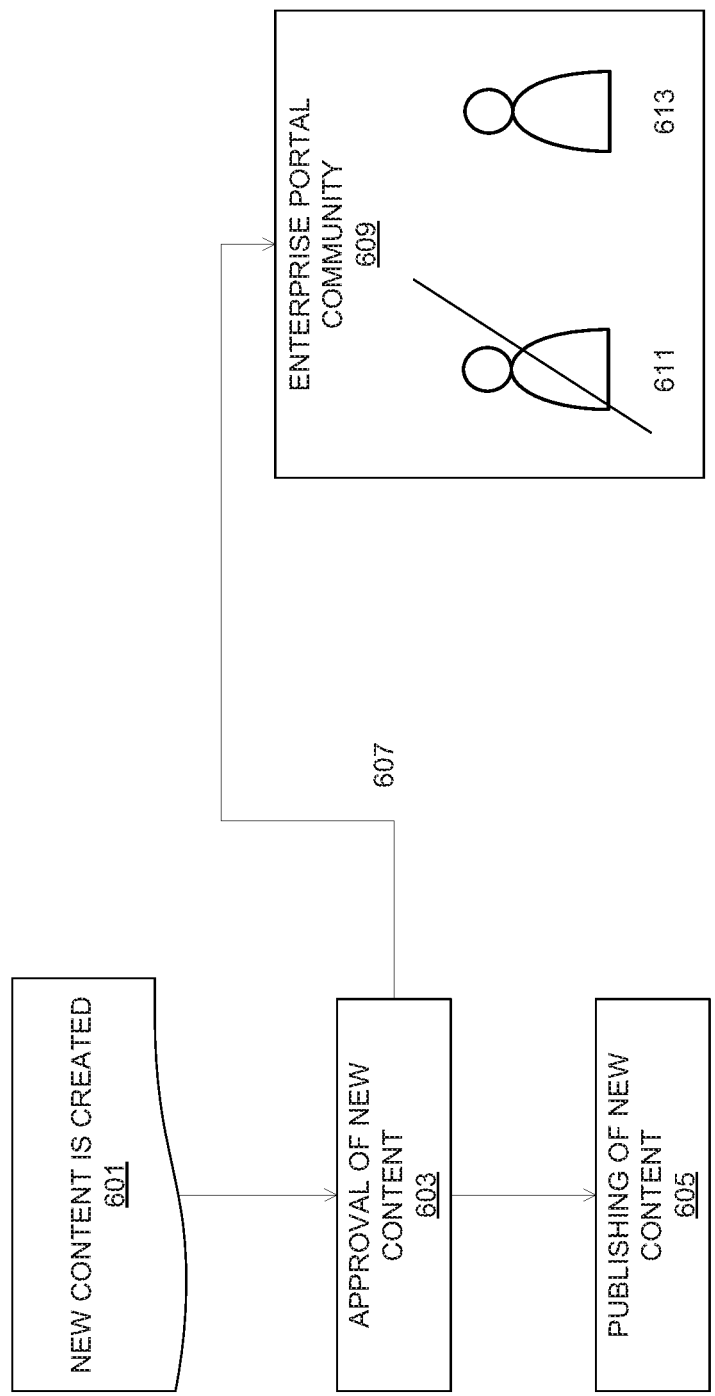
FIG. 6 is a block diagram of a dynamic workflow illustrating the effect of the dynamic actor determination engine, according to one exemplary embodiment of the principles described herein.

FIG. 6 illustrates the functioning of a dynamic actor determination engine according to one embodiment. New content may be created (601). In a next step of the dynamic workflow, the new content must get approval (603). But instead of sending it to a default, pre-defined editor for approval, the dynamic actor determination engine dynamically determines, based on additional variables (607), a user, who may have editor rights, to approve the information item. Such a dynamic determination of an approver may be based on a second information item status level that is associated to the information item. If, for example, the second information item status level indicates that the publication of the information item is very urgent, the dynamic actor determination engine may determine which of the potential editors (611, 613) are currently online and signed-in as users of a groupware application. The groupware application may be part of an enterprise portal community (609) which may be connected to the content management system comprising the dynamic actor determination engine. If two potential users (611, 613) may potentially approve the newly created information item, and only user (613) is currently active, online, or logged in and the other user (611) is either inactive, not logged in, or not active in the system, the dynamic actor determination engine may assign (607) the next action in the workflow to the active user (613) with the appropriate permission to perform the next approval step, before publishing (605).

The dynamic actor determination engine may also base the determination of a user to which the next approval step should be assigned to on another aspect of the second information item status level. If the second information item status level may indicate that the information is meant to be for handicapped persons, the dynamic actor determination engine may direct the information item to be approved to a special user having the permission and capabilities to approve content for handicapped persons. As an example, content for handicapped persons may contain, in particular, very large characters.

In case there are three potential users having the permission to approve information items with different language skills, the dynamic actor determination engine may assign the next step or next stage of the workflow to an especially skilled user, with the appropriate language skills. Again, the dynamic actor determination engine may use the second information item status level that indicates that the information is written in a specific language. Alternatively or in addition, the second information item status level may be used to assign a next step or stage in the workflow to the user having special skills that are compatible with a special content area to which the information item is related. For example, an information item for a product area A from an enterprise may be directed to an editor with special product skills in product area A. Furthermore, it should be noted that there may be several "second information item status level" indicators provided. One additional information item status level may be provided for urgency, another for the language of the information item, another for a content area, yet another one for a content-type. Combinations of different information item status levels for a dynamic determination as well as additional information items status levels are possible.

Figure 7:
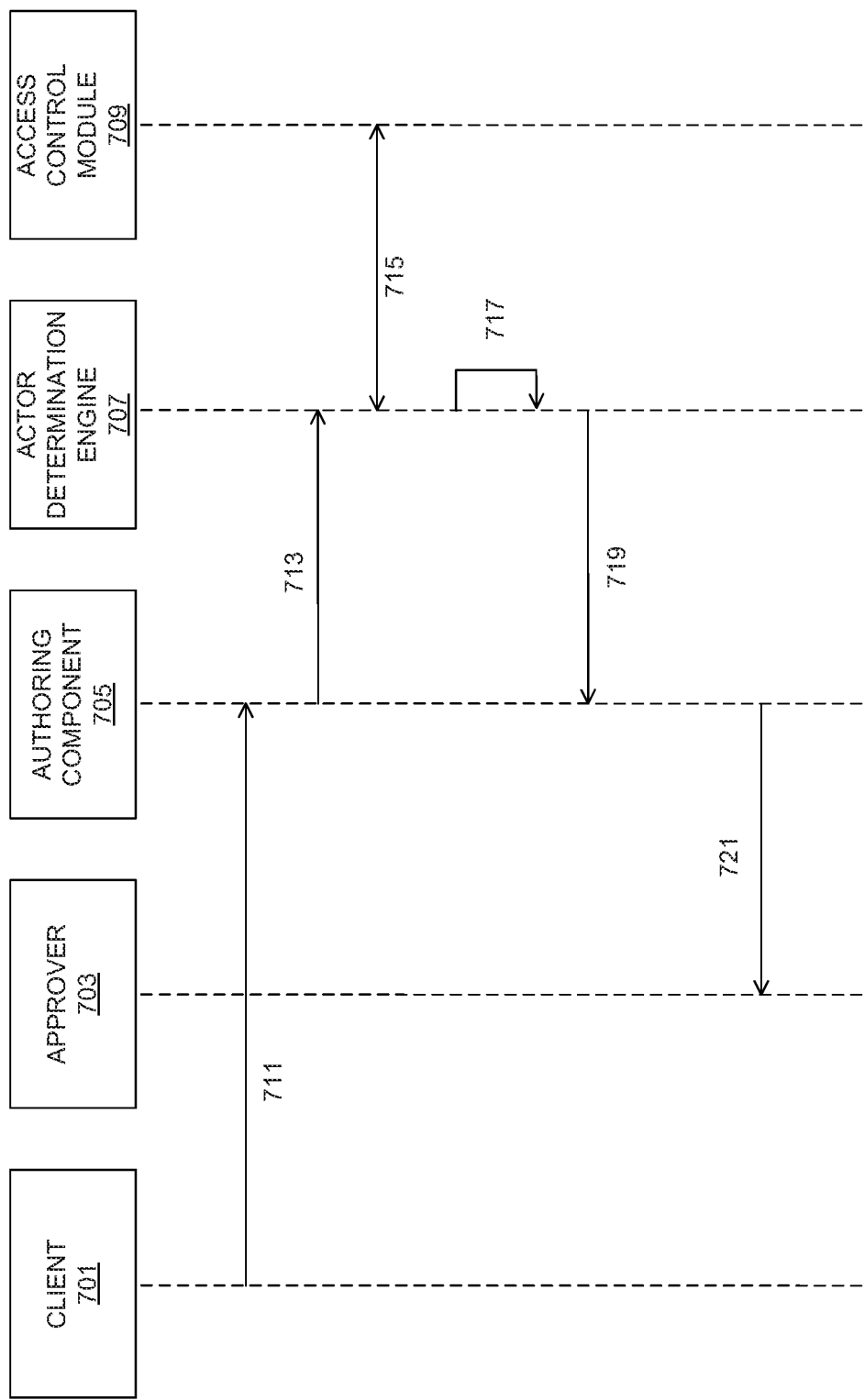
FIG. 7 is a flow diagram illustrating a workflow under the control of the dynamic actor determination engine of the content management system, according to one exemplary embodiment of the principles described herein.

FIG. 7 illustrates a flow diagram or transaction status diagram of the exemplary dynamic actor determination engine. A client, user, contributor, or modifier (701)—or even a related computer system—saves a modification of information item C (711). An authoring component (705) of the content management system requests (713) a set of approvers for the modification for information item C from the dynamic actor determination engine (707). In order to achieve this, the dynamic actor determination engine (707) may request (715) all potential approvers according to appropriate user permissions from access control module (709). Next, the dynamic actor determination engine (707) filters (717) a set of potential approvers using the static and dynamic user profile data and pre-defined dynamic actor conditions for information item C. In step (719) the dynamic actor determination engine (707) sends (719) a set of potential approvers to the authoring component (705). After that, a notification (721) about a pending approval is sent to one or more approvers (703).

It should be noted that the dynamic actor determination engine does not have to select a single user for the next action required in the next workflow stage. Instead, the dynamic actor determination engine may also select a series of potential actors for the next workflow stage. In this case, all potential approvers or users for the next workflow stage will be informed, for example by e-mail, that there is a pending next step in the workflow process to be performed by the user.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Current examples of optical discs include compact disc-read only memory (CD-ROM), compact disc-read/write (CD-R/W), DVD and Blue-Ray-Disc. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for adapting a workflow of a content management system, the method comprising:
   receiving, at the content management system, at least one information item comprising content;
   with a workflow engine, executing the workflow with respect to the at least one information item, the workflow comprising stages arranged in a pre-defined sequence, each stage corresponding to a respective information item status level;
   with the workflow engine, receiving a request to change the workflow for a particular information item;
   with the workflow engine, verifying that a requesting user associated with the request has permission for the request, determining a current workflow stage for the particular information item, evaluating profile data of a last modifier of the particular information item, evaluating a user profile of a current user of the particular information item, and, based on these inputs, determining whether to make a change in the pre-defined sequence of stages;
   with the workflow engine, in response to determining to make a change, changing the pre-defined sequence of stages;
   with the workflow engine, determining which of a plurality of users of the content management system have signed into a groupware application executing on an enterprise portal community associated with the content management system and are currently active on the groupware application so as to be available to currently manage a next stage in the workflow with respect to the at least one information item; and
   with the workflow engine, choosing a user from among the plurality of users to manage the next action in a next stage in the workflow based on a number of characteristics of the content within the information item, based on user status information that is indicative of a different status of different users among the plurality of users and based on user availability, such that the next stage of the workflow is advanced.

2. The method of claim 1, wherein the user status information comprises a user role status that defines what actions in the workflow each of a respective user is allowed to engage in.

3. The method of claim 2, wherein the user status information further defines, based on the status of each of the plurality of users, those stages in the workflow that may be omitted from the workflow.

4. The method of claim 1, wherein the at least one information item includes a number of allowed actions established for a particular user who created the at least one information item.

5. The method of claim 1, wherein the next stage of the workflow is determined based on a combination of:
   different types of user status information, indicative of a status of a corresponding particular user;
   a first information item status level indicative of a present status level of the content within the workflow; and
   a second information item status level indicative of a number of characteristics of the content within the information item.

6. The method of claim 1, wherein the workflow prepares the content for online publication, the stages in the workflow comprising drafting, editing, approving, publishing and deleting.

7. The method of claim 1, wherein the at least one information item further comprises an indication of urgency level.

8. A content management system for adapting a workflow, the content management system comprising:
   a server comprising a processor and associated memory, the server to receive at least one information item comprising content;
   the server to execute the workflow via a workflow engine, wherein the workflow comprises stages in a pre-defined sequence, each stage corresponding to a respective information item status level, the workflow engine to dynamically modify the workflow from the pre-defined sequence such that a next stage of the workflow is determined based on user status information that is indicative of a different status of different users, wherein the server is to dynamically alter the workflow such that a stage of the workflow is selectively omitted depending on a particular status of a corresponding user;
   the server to determine whether a user performing a previous stage of the workflow has a positive historic transaction status flag set and, in response to the flag being set for the user, change the pre-defined sequence of remaining stages of the workflow include selecting a next stage of the workflow, wherein the positive historic transaction flag is set based on the user have previously produced a threshold number of information items within the workflow that were subsequently approved upon review without modification;

wherein the server is to determine a next stage of the workflow based on a first information item status level indicative of a present status level of the content within the workflow.

9. The system of claim 8, wherein the user status information comprises a user role status that defines what actions in the workflow each of a respective user is allowed to engage in.

10. The system of claim 9, further comprising the server to determine which of a plurality of users of the content management system have signed into a groupware application executing on an enterprise portal community associated with the content management system and are currently active on the groupware application so as to be available to manage a next stage in the workflow; and the server to choose a user from among the plurality of users to manage the next stage in the workflow based on user availability.

11. The system of claim 8, wherein the at least one information item includes a number of allowed actions established for a particular user who created the at least one information item.

12. The system of claim 8, wherein the workflow prepares the content for online publication, the stages in the workflow comprising drafting, editing, approving, publishing and deleting.

13. The system of claim 8, wherein the at least one information item further comprises an indication of urgency level.

14. A computer program product for adapting a workflow, the computer program product comprising:

a non-transitory computer readable storage medium having computer readable program code embodied therewith, the computer readable program code comprising computer readable program code to, when executed by a processor:

receive, at a content management system, at least one information item comprising content;

execute the workflow via a workflow engine which comprises stages in a pre-determined sequence, each stage corresponding to a respective information item status level, such that a next stage of the workflow changing the pre-determined sequence is determined based on user status information that is indicative of a different status of different users including entirely omitting a stage of the workflow in response to a combination of: a particular status of a corresponding user involved in the workflow including a positive historical transaction record of the user who generated the particular information item, the particular status of a user who generated a particular information item, a special technical field of a user who works on the particular information item and the particular status of a reviewer who reviews the particular information item;

determine which of a plurality of users of the content management system have signed into a groupware application executing on an enterprise portal community associated with the content management system and are currently active on the groupware application so as to be available to currently approve the at least one information item; and choose a user from among the plurality of users to manage the next stage in the workflow based on a number of characteristics of the content within the information item and different skills of the plurality of users.

15. The computer program product of claim 14, wherein the user status information comprises a user role status that defines what actions in the workflow each of a respective user is allowed to engage in.

16. The computer program product of claim 14, wherein the user status information further defines, based on the status of each of the plurality of users, those stages in the workflow that may be omitted from the workflow.

17. The computer program product of claim 14, wherein the skills of the plurality of users comprise language skills or skills specific to a particular audience for which the content is being published.

18. The computer program product of claim 14, wherein the next stage of the workflow is determined differently from the pre-defined sequence based on a combination of:

different types of user status information, indicative of a status of a corresponding particular user;

a first information item status level indicative of a present status level of the content within the workflow; and a second information item status level indicative of a number of characteristics of the content within the information item.

19. The computer program product of claim 14, wherein the workflow prepares the content for online publication, the stages in the workflow comprising drafting, editing, editorial approval, legal approval, publishing and deleting.

* * * * *